United States Patent
Andrus, Jr. et al.

(10) Patent No.: US 8,480,768 B2
(45) Date of Patent: *Jul. 9, 2013

(54) HOT SOLIDS GASIFIER WITH $CO_2$ REMOVAL AND HYDROGEN PRODUCTION

(75) Inventors: Herbert E. Andrus, Jr., Granby, CT (US); Michael S. McCartney, Vero Beach, FL (US)

(73) Assignee: ALSTOM Technology Ltd, Baden (CH)

( * ) Notice: Subject to any disclaimer, the term of this patent is extended or adjusted under 35 U.S.C. 154(b) by 227 days.

This patent is subject to a terminal disclaimer.

(21) Appl. No.: 13/159,002

(22) Filed: Jun. 13, 2011

(65) Prior Publication Data

US 2011/0243803 A1    Oct. 6, 2011

Related U.S. Application Data

(63) Continuation of application No. 12/239,232, filed on Sep. 26, 2008, now Pat. No. 7,988,752, and a continuation of application No. 11/422,703, filed on Jun. 7, 2006, now Pat. No. 7,445,649, and a continuation of application No. 10/449,137, filed on May 29, 2003, now Pat. No. 7,083,658.

(51) Int. Cl.
   *B01J 7/00* (2006.01)
(52) U.S. Cl.
   USPC ............... 48/61; 48/198.3; 48/198.5; 48/201; 48/210; 48/212; 48/215; 48/197 R; 48/76; 48/72; 48/77; 423/428; 252/373; 252/376
(58) Field of Classification Search
   USPC ............................ 48/76, 72, 77, 61; 423/428
   See application file for complete search history.

(56) References Cited

U.S. PATENT DOCUMENTS

| 3,969,089 A | 7/1976 | Moss et al. |
| 4,026,679 A | 5/1977 | Collin |

(Continued)

FOREIGN PATENT DOCUMENTS

| EP | 0 030 152 | 1/1980 |
| WO | WO 2004/106469 | 12/2004 |

OTHER PUBLICATIONS

Unit Processes and Principles of Chemical Engineering—Olsen, John C., Jul. 5, 1932, New York; D. Van Nostrand Company, Inc., Chapter 1 (pp. 1-3).

*Primary Examiner* — Kaity V. Handal
(74) *Attorney, Agent, or Firm* — James J. Cummings

(57) ABSTRACT

A gasifier 10 includes a first chemical process loop 12 having an exothermic oxidizer reactor 14 and an endothermic reducer reactor 16. CaS is oxidized in air in the oxidizer reactor 14 to form hot $CaSO_4$ which is discharged to the reducer reactor 16. Hot $CaSO_4$ and carbonaceous fuel received in the reducer reactor 16 undergo an endothermic reaction utilizing the heat content of the $CaSO_4$, the carbonaceous fuel stripping the oxygen from the $CaSO_4$ to form CaS and a CO rich syngas. The CaS is discharged to the oxidizer reactor 14 and the syngas is discharged to a second chemical process loop 52. The second chemical process loop 52 has a water-gas shift reactor 54 and a calciner 42. The CO of the syngas reacts with gaseous $H_2O$ in the shift reactor 54 to produce $H_2$ and $CO_2$. The $CO_2$ is captured by CaO to form hot $CaCO_3$ in an exothermic reaction. The hot $CaCO_3$ is discharged to the calciner 42, the heat content of the $CaCO_3$ being used to strip the $CO_2$ from the CaO in an endothermic reaction in the calciner, with the CaO being discharged from the calciner 42 to the shift reactor 54.

29 Claims, 4 Drawing Sheets

U.S. PATENT DOCUMENTS

| | | |
|---|---|---|
| 4,272,399 A | 6/1981 | Davis et al. |
| 4,309,198 A | 1/1982 | Moss |
| 4,435,148 A | 3/1984 | Moss |
| 4,459,133 A | 7/1984 | Moss |
| 4,508,544 A | 4/1985 | Moss |
| 4,738,207 A | 4/1988 | Moss |
| 6,083,409 A | 7/2000 | Lin et al. |
| 6,669,917 B2 | 12/2003 | Lyon |
| 6,685,754 B2 | 2/2004 | Kindig et al. |
| 6,911,057 B2 | 6/2005 | Lyon |

HOT SOLIDS GASIFIER WITH $CO_2$ REMOVAL AND HYDROGEN PRODUCTION

CROSS REFERENCE TO RELATED APPLICATION

This application is a Continuation of U.S. patent application Ser. No. 12/239,232, filed Sep. 26, 2008, which is a Continuation of U.S. patent application Ser. No. 11/422,703, filed Jun. 7, 2006, now U.S. Pat. No. 7,445,649, which is a Continuation of U.S. patent application Ser. No. 10/449,137, filed May 29, 2003 now U.S. Pat. No. 7,083,658, which are incorporated by reference herein in their entirety.

BACKGROUND OF THE INVENTION

This invention relates generally to a method for producing hydrogen. More particularly, the present invention relates to a method utilizing fossil fuels, biomass, petroleum coke, or any other carbon bearing fuel to produce hydrogen for power generation which minimizes or eliminates the release of carbon dioxide ($CO_2$).

Fossil fuel power stations conventionally use steam turbines to convert heat into electricity. Conversion efficiencies of new steam power stations can exceed 40% on a lower heating value basis (LHV). New supercritical steam boiler designs, relying on new materials, allow higher steam temperatures and pressures, providing efficiencies of close to 50% LHV and further improvements might be expected. Significant advancements have also been made in combined cycle gas turbines (CCFTs). A gas turbine can withstand much higher inlet temperatures than a steam turbine. This factor produces considerable increases in overall efficiency. The latest designs currently under construction can achieve efficiencies of over 60% LHV. All of these improvements in efficiency translate into a reduction of the specific emissions on a per megawatt basis.

Although substantial reductions in emissions of $CO_2$ could be achieved by increase in efficiency of energy conversion and utilization, such reductions may not be sufficient to achieve atmospheric $CO_2$ stabilization. Therefore, efforts have also been directed towards the capture and sequestration of the $CO_2$ emitted by fossil fuel-fired power plants. Sequestration of $CO_2$ entails the storage or utilization of $CO_2$ in such a way that it is kept out of the atmosphere. Capture of the $CO_2$ may be performed prior to or after combustion of the fuel. Production of $CO_2$ may be minimized during combustion of the fuel.

The fuel may be de-carbonized prior to combustion by extracting $H_2$ from the hydrocarbon fuel, the $CO_2$ being captured and the $H_2$ being subsequently combusted. Steam reforming, gasification and partial oxidation are examples of such processes. The most promising de-carbonization approach is via Integrated Gasification Combined Cycle (IGCC). With IGCC, coal is gasified to produce a synthesis gas, which is then catalytically water gas shifted in order to increase the $CO_2$ concentration. This shifted synthesis gas is quenched, and $CO_2$ is removed with a solvent, such as selexol, in a process analogous to the amine flue gas scrubbing. Separated $CO_2$ is dried and compressed to supercritical conditions for pipeline transport. The cleaned synthesis gas, now rich in $H_2$, is fired in a combustion turbine and waste heat from the gasification quench and from the GT fuel gas is recovered to raise steam and feed a steam turbine. Because the $CO_2$ is removed from the concentrated and pressurized synthesis gas stream, the incremental capital cost and energy penalty is lower than for the capture of $CO_2$ from flue gas. A study by Parsons Energy and Chemical Group, Inc. has shown an incremental energy penalty of about 14% and the cost of $CO_2$ mitigation of about $18/tonne (Owens, et al., 2000).

Combustion of the fossil fuel in $O_2$/recycled flue gas eliminates the need for capture of $CO_2$ by using pure or enriched oxygen instead of air for combustion. A substantial energy penalty is incurred using this process due to the large power requirements of producing pure oxygen.

Alternatively, separation of $CO_2$ after combustion with air can be accomplished by a variety of techniques. The most well established method today is removal from the flue gas stream by amine solvent scrubbing in an absorption-stripping process. Such processes are already applied commercially to coal-fired boilers for the purpose of producing $CO_2$ for industrial or food industry use. Unfortunately, substantial capital equipment is required. The efficiency of the power plant is significantly reduced by the energy required to regenerate the solvent. Studies of amine scrubbing technology applied to a U.S. utility boiler case indicate that capital investment is on the order of the original power plant and energy efficiency is reduced by 41%.

SUMMARY OF THE INVENTION

Briefly stated, the invention in a preferred form is a method for producing a gas product from a carbonaceous fuel which comprises a first chemical process loop including an exothermic oxidizer reactor and an endothermic reducer reactor. The oxidizer reactor has a CaS inlet, a hot air inlet and a $CaSO_4$/waste gas outlet. The reducer reactor has a $CaSO_4$ inlet in fluid communication with the oxidizer reactor $CaSO_4$/waste gas outlet, a CaS/gas product outlet in fluid communication with the oxidizer reactor CaS inlet, and a materials inlet for receiving the carbonaceous fuel. CaS is oxidized in air in the oxidizer reactor to form hot $CaSO_4$ which is discharged to the reducer reactor. Hot $CaSO_4$ and carbonaceous fuel received in the reducer reactor undergo an endothermic reaction utilizing the heat content of the $CaSO_4$, the carbonaceous fuel stripping the oxygen from the $CaSO_4$ to form CaS and the gas product. The CaS is discharged to the oxidizer reactor, and the gas product being discharged from the first chemical process loop.

When the gas product is a CO rich syngas, the method further comprises a second chemical process loop including a water-gas shift reactor having a syngas inlet in fluid communication with the reducer reactor CaS/gas product outlet. The shift reactor also has a CaO inlet, a steam inlet for receiving gaseous $H_2O$, and a particulate outlet. A calciner has a $CaCO_3$ inlet in fluid communication with the shift reactor particulate outlet and a CaO outlet in fluid communication with the shift reactor CaO inlet. The CO of the syngas reacts with the gaseous $H_2O$ to produce $H_2$ and $CO_2$, the $CO_2$ being captured by the CaO to form hot $CaCO_3$ in an exothermic reaction, the hot $CaCO_3$ being discharged to the calciner, the heat content of the $CaCO_3$ being used to strip the $CO_2$ from the CaO in an endothermic reaction in the calciner, and the CaO being discharged from the calciner to the shift reactor.

The shift reactor may also have a fuel inlet for receiving the carbonaceous fuel. In this case, the CO of the syngas and the carbonaceous fuel reacts with the gaseous $H_2O$ to produce $H_2$, $CO_2$, and partially decarbonated, hot carbonaceous particulates, with the hot carbonaceous particulates being discharged to the reducer reactor.

The oxidizer reactor may also have a particulate heat transfer material inlet and a particulate heat transfer material outlet and the calciner may also have a particulate heat transfer material inlet in fluid communication with the oxidizer reactor particulate heat transfer material outlet, and a particulate heat transfer material outlet in fluid communication with the oxidizer reactor particulate heat transfer material inlet. Hot $CaSO_4$ discharged by the oxidizer reactor is used in the endothermic reaction of the calciner and cooled $CaSO_4$ is discharged from the calciner to the oxidizer reactor.

The shift reactor also includes an $H_2$ outlet for discharging $H_2$ from the gasifier. The shift reactor particulate outlet includes a heavies outlet discharging heavy particulates from the shift reactor and a lights outlet discharging a mixture of $H_2$ and light particulates from the shift reactor. A separator in fluid communications with the shift reactor lights outlet separates the light particulates from the $H_2$, discharges the $H_2$ from the gasifier, discharges a portion of the light particulates to the reducer reactor lights inlet and another portion to the calciner $CaCO_3$ inlet.

The reducer reactor may also include a char gasifier in fluid communication with the shift reactor particulate outlet, a char combustor in fluid communication with the char gasifier, and a carbon burn-out cell in fluid communication with the char combustor and the oxidizer reactor CaS inlet. The char gasifier includes a heavies inlet in fluid communication with the shift reactor heavies outlet, a lights inlet in fluid communication with the separator, and a hot gas outlet of the char gasifier is in fluid communication with a hot gas inlet of the shift reactor. A char outlet and a hot gas inlet of the char gasifier are in fluid communication with a char inlet and a hot gas outlet of the char combustor. A char outlet and a hot gas inlet of the char combustor are in fluid communication with a char inlet and a hot gas outlet of the carbon burn-out cell. The carbon burn-out cell includes a CaS outlet in fluid communication with the oxidizer reactor CaS inlet. Hot $CaSO_4$ from the oxidizer reactor $CaSO_4$/waste gas outlet is supplied to the carbon burn-out cell and the char combustor and may be supplied to the char gasifier and/or the shift reactor.

The calciner may include a calciner vessel having the $CaCO_3$ inlet and CaO outlet and a combustor in fluid communication with the calciner vessel, the combustor having an air inlet and a CaS inlet. Air and CaS combusted in the combustor produces hot sorbent particles which are discharged to the calciner vessel, the heat content of the sorbent particles calcining the $CaCO_3$ to produce CaO and $CO_2$. A settling chamber is disposed intermediate the combustor and the calciner vessel such that hot sorbent particles entrained in flue gas discharged from the combustor enter the settling chamber, where hot heavy sorbent particles fall out the flue gas and enter the calciner. The flue gas and entrained light sorbent particles are discharged to a first separator, where the fine sorbent particles are separated from the flue gas. The CaO and the $CO_2$ produced by calcining the $CaCO_3$ are discharged from the calciner vessel to a second separator. $CO_2$ produced by calcining the $CaCO_3$ is also discharged through a bypass line. A bypass valve controls the $CO_2$ flow distribution between the separator and the bypass line, thereby limiting the exit velocity of the $CO_2$ to the separator to prevent entrainment of heavy sorbent particles in the exiting $CO_2$. The second separator discharges the CaO to the shift reactor.

It is an object of the invention to provide a method which produces a medium Btu syngas without requiring and oxygen plant.

It is also an object of the invention to provide a method which captures carbon dioxide, generated during production a medium Btu syngas, more efficiently than conventional methods.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

With reference to the drawings wherein like numerals represent like parts throughout the several figures, a gasifier in accordance with the present invention is generally designated by the numeral 10. The gasifier 10 includes chemical process loops, where calcium based compounds are "looped" to extract oxygen from air and where $CO_2$ is extracted from reformed synthetic gas ("syngas") to produce hydrogen ($H_2$), and thermal process loops, where solid particulates transfer heat from exothermic oxidation reactions to endothermic reduction reactions.

Figure 1:
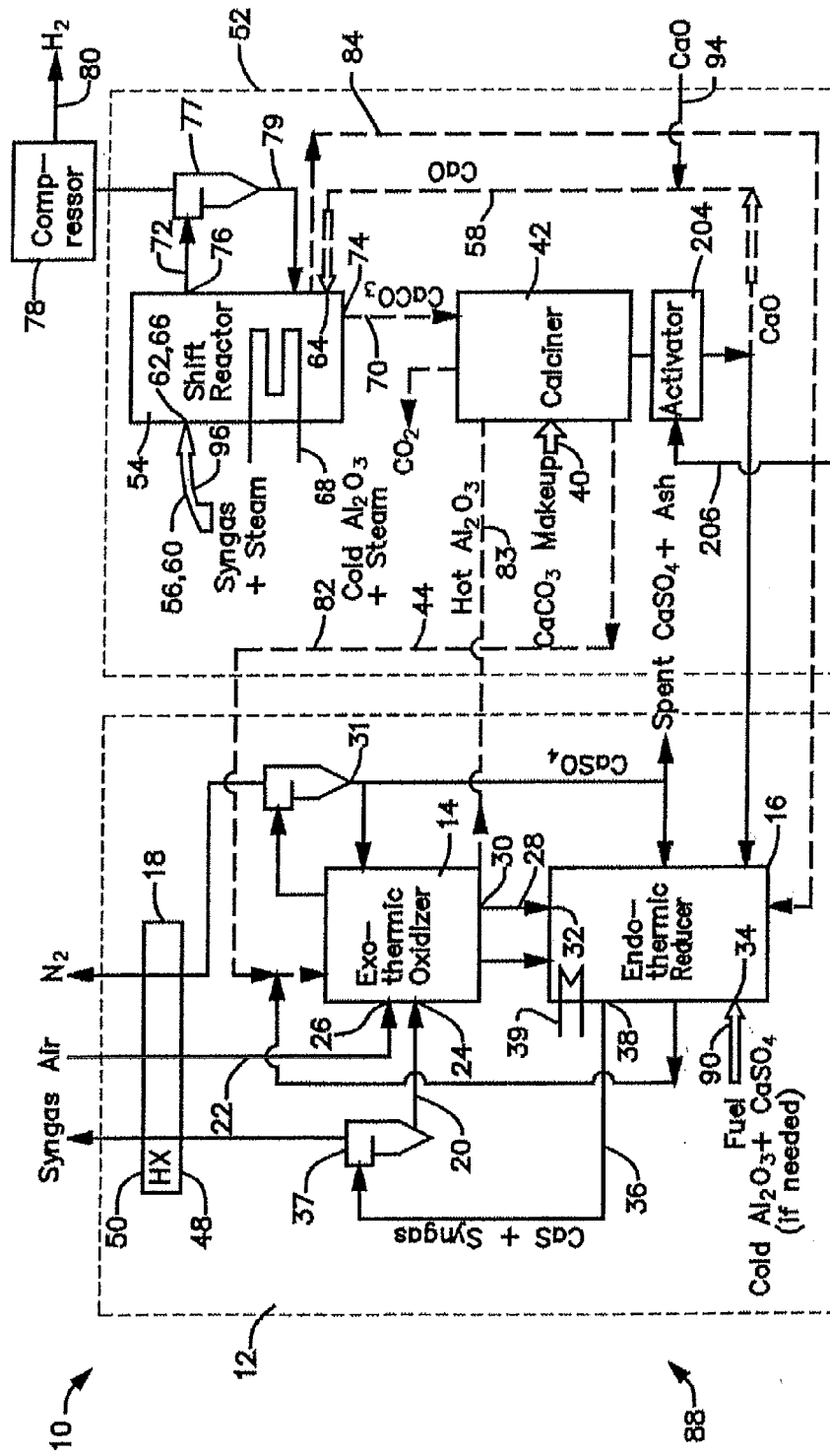
FIG. 1 is a simplified schematic diagram of a first embodiment of a gasifier, having $CO_2$ removal and hydrogen production, in accordance with an embodiment of the invention.

As shown in FIG. 1, the first chemical process loop is a calcium sulfide/calcium sulfate ($CaS/CaSO_4$) loop 12. The process equipment in the $CaS/CaSO_4$ loop 12 includes an exothermic oxidizer reactor 14, an endothermic reducer reactor 16, and a heat exchanger 18. Conventional piping, ductwork, and material transport apparatus interconnect these major components 14, 16, 18 of the $CaS/CaSO_4$ loop 12 as described in greater detail below. Calcium sulfide and hot air are fed along paths 20, 22 through inlets 24, 26 into the oxidizer reactor 14 where the CaS is oxidized at a temperature of 1600 to 2300° F. to form $CaSO_4$ which is discharged at a location 28 from the oxidizer reactor through an outlet 30. The $CaSO_4$ is separated from the waste gas components (principally $N_2$) of the air fed along the path 22 into the loop 12 in a separator 31. The $CaSO_4$, heated by the exothermic reaction in the oxidizer reactor 14, and carbon bearing fuel, preferably in the form of coal, are fed along paths 28, 90 into the reducer reactor through inlets 32, 34. In an endothermic reaction occurring at a temperature of 1200 to 2000° F., the coal strips the oxygen from the calcium sulfate to form calcium sulfide, a syngas rich in carbon monoxide (CO) and $H_2$. The CaS is discharged along a path 36 from the reducer reactor 16 through an outlet 38 which is connected to a separator 37, where the CaS is separated from the syngas, the CaS being discharged to the inlet 24 of the oxidizer reactor 14, to complete the loop 12. A heat exchange unit 39 may be disposed within the reducer reactor 16 to produce steam.

A portion of the calcium carbonate ($CaCO_3$) added along a path 40 to the calciner 42 (described in greater detail below) is carried over along a path 44 (as CaO) to the first chemical process loop 12 to capture fuel bound sulfur, forming $CaSO_4$. $CaSO_4$ which is excess to the loop requirements is discharged along the path 46 from either the oxidizer reactor 14 or the reducer reactor 16 to maintain the mass balance of the chemical reactions. The continuous requirement to capture fuel-bound sulfur to form $CaSO_4$ regenerates the calcium compounds used in the first chemical process loop 12, keeping the chemical reactivity high. Depending on the mass flow rate, the heat content of the $CaSO_4$ may be sufficient to maintain the heat balance between the exothermic oxidizer reactor 14 and the endothermic reducer reactor 16. If the mass flow rate of the $CaSO_4$ is insufficient to maintain the heat balance, inert bauxite ($Al_2O_3$) particles may be circulated along paths 28, 36, 20 between the oxidizer reactor 14 and the reducer reactor 16 to increase the total mass of the heat transfer medium.

The heat exchanger 18 includes a hot end 48 having syngas and waste gas inlets and an air outlet, a cold end 50 having syngas and waste gas outlets and an air inlet, and heat transfer material disposed between the hot and cold ends defining flow passages between the syngas inlet and outlet, the waste gas inlet and outlet, and the air outlet and inlet. The syngas (CO) inlet is connected to the syngas outlet of the reducer reactor 16, the waste gas inlet is connected to the waste gas outlet of the oxidizer reactor 14, and the air outlet is connected to the air inlet of the oxidizer reactor 14. The heat content of the syngas and waste gas is transferred to the air delivered to the oxidizer reactor by the heat transfer material of the heat exchanger 18, improving the efficiency of the exothermic reaction in the oxidizer reactor 14.

In the first chemical process loop 12, the amount of oxygen in the air delivered to the coal is only sufficient for partial oxidation. In this case, the end product is a sulfur free syngas rich in carbon monoxide (>300 Btu/ft$^3$) suitable for a gas turbine combined cycle. Alternatively, when the amount of oxygen supplied is sufficient to burn all of the coal, the loop acts as a combustion system having end products of pure $CO_2$ and steam.

The second chemical process loop is a lime/calcium carbonate ($CaO/CaCO_3$) loop 52. The process equipment in the $CaO/CaCO_3$ loop includes a calciner 42 and a water-gas shift reactor 54. Conventional piping, ductwork, and material transport apparatus interconnect these components as described in greater detail below. Steam, lime (CaO), and the CO rich syngas produced in the $CaS/CaSO_4$ loop 12 are fed along paths 56, 58, 60 through inlets 62, 64, 66 into the shift reactor 54 where, the CO of the syngas reacts with the gaseous $H_2O$ to produce $H_2$ and $CO_2$. The lime captures the $CO_2$, forming $CaCO_3$ in an exothermic reaction, producing a temperature level of 1200-1700° F. This heat can drive a gasification reaction of the entering fuel and gas and may generate, as schematically shown at location 68, high temperature steam for a steam turbine.

The $CaCO_3$ and $H_2$ are each discharged along paths 70, 72 from the shift reactor 54 through an outlet 74, 76. The $H_2$ is received in a separator 77, where any fines entrained in the flow of $H_2$ are removed and discharged along a path 79 to the shift reactor 54. A compressor 78 in the syngas discharge line 80 pressurizes the $H_2$ to a sufficient level to inject the $H_2$ into a gas turbine, fuel cell or other hydrogen using process. The $CaCO_3$ is transported to the calciner 42 to drive off $CO_2$ gas and to regenerate CaO which is then returned along a path 58 to the shift reactor 54 to capture more $CO_2$, completing the loop 52. Capture of the $CO_2$ by the production of $CaCO_3$ drives the endothermic gasification reaction between the carbon dioxide, water and fuel to produce a greater quantity of carbon monoxide and hydrogen and to limit the amount of heat which must be removed (by producing steam 68). The hydrogen is produced by the water gas shift reaction

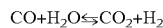

and the carbon dioxide is captured by the reaction

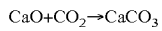

When the two chemical process loops 12, 52 and thermal process loops 82, 83; 84, 85 are combined, a coal to hydrogen chemical process 88 is formed where the CaO required by the reducer reactor 16 is produced by the calciner 42, the CO rich syngas required by the shift reactor 54 is produced by the reducer reactor 16, and the heat required by the calciner 42 is produced by the oxidizer reactor 14 (described in greater detail below). The gasifier 10 and process for producing hydrogen 88 disclosed herein is more efficient than the oxygen blown IGCC process, the parasitic power loss of the oxygen plant, the heat losses associated with water-gas shift cooling, and the low temperature sulfur recovery associated with the IGCC process outweighing the need for a syngas compressor 78 in the subject gasifier 10.

The calciner 42 in the $CaO/CaCO_3$ loop 52 is a high temperature endothermic reactor that receives its heat from the oxidizer reactor 14 in the $CaS/CaSO_4$ loop 12. In a first embodiment of a thermal process loop 82, 83 transferring heat from the oxidizer reactor 14 to the calciner 42 (FIG. 1), a heat exchange mass in the form of inert particles, such as bauxite ($Al_2O_3$) particles or sorbent (CaO, $CaCO_3$, CaS, $CaSO_4$) particles is circulated 82, 83 between the oxidizer reactor 14 and the calciner 42 via interconnecting piping. The bauxite, CaO, CaS, and $CaSO_4$ is chemically inert in the calciner and can be separated from the reactants of either chemical process loop 12, 52 allowing the heat to be balanced independent of the mass balance of the chemically active material. Any bauxite which is lost during the operating cycle of the gasifier 10 may be made-up by adding, along the path 90, new bauxite particles through an inlet 34 to the reducer reactor 16.

Figure 3:
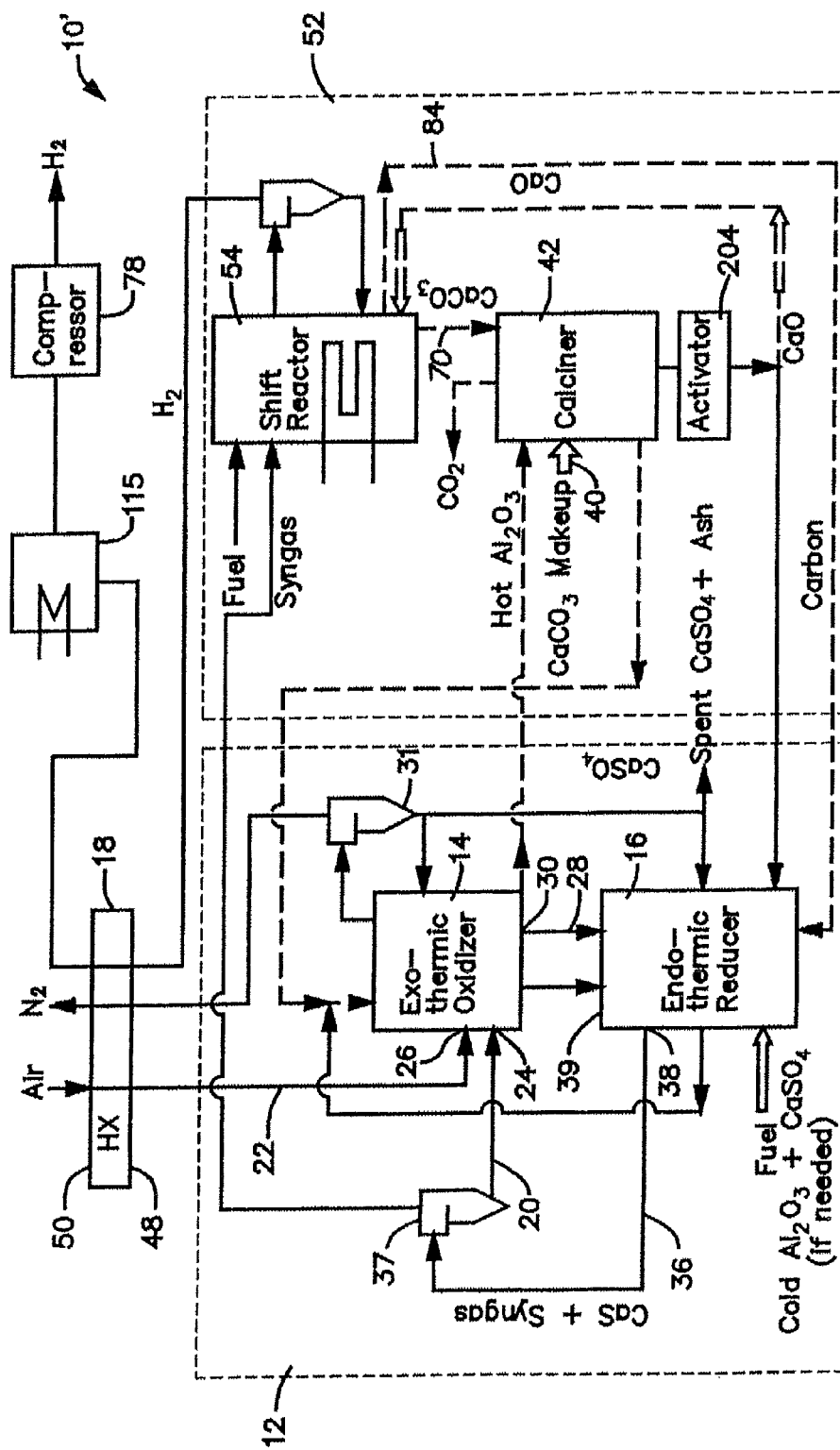
FIG. 3 is a simplified schematic diagram of a second embodiment of a gasifier, having $CO_2$ removal and hydrogen production, in accordance with an embodiment of the invention.
Figure 4:
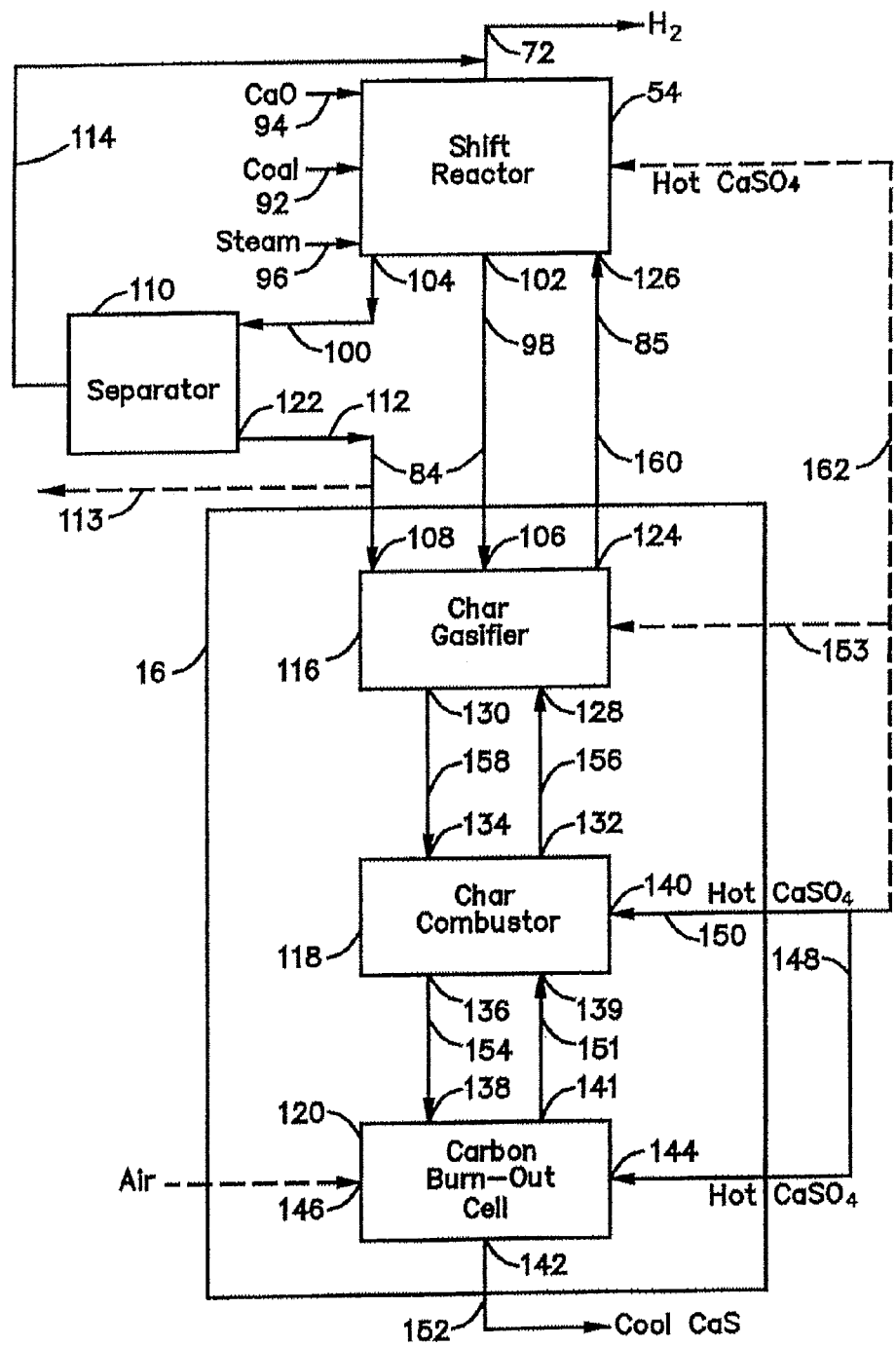
FIG. 4 is a schematic diagram of the fuel flow path of FIG. 3.

With reference to FIGS. 3 and 4, sorbent (CaO, $CaCO_3$, CaS, $CaSO_4$) particles and coal (carbon) particles are the primary heat transfer mass in a second embodiment of the gasifier 10'. Bauxite particles may be utilized to provide for any heat transfer mass that is required for operation but which is not provided by the sorbent and coal particles. The raw coal utilized by the gasifier 10' is fed along a path 92 into the shift reactor 54 through an inlet (along with the lime and steam 94, 96). The high temperature generated by the exothermic reaction producing the $CaCO_3$ devotalize and partially decarbonate the coal, with the resulting char, in the form of "heavies" and "lights", being discharged along paths 98, 100 from the shift reactor 54 through a pair of outlets 102, 104 which are connected to a pair of inlets 106, 108 on the reducer reactor 16. $CaCO_3$ particles, in the form of lights, are also discharged 100 from the shift reactor 54. The flow of lights is received in a separator 110, where the small particles of char and calcium carbonate are separated from the hydrogen in which they are entrained. The lights and the hydrogen are discharged along paths 112, 114 from the separator 110, with the hydrogen being piped to the hydrogen discharge 72 of the shift reactor 54 and the lights joining the large char particles (the heavies) in the reducer reactor 16. A portion of the small char particles and $CaCO_3$ may be fed along a path 113 to the calciner 42 to regenerate CaO and separate $CO_2$. A heat exchange unit 115 may be disposed between the shift reactor 54 and the compressor 78 to produce steam.

In the thermal process loop 84, 85 of this embodiment 10', the reducer reactor 16 comprises three sections, a char gasifier 116, a char combustor 118 and a carbon burn-out cell 120. As shown in FIG. 4, the char gasifier heavies and lights inlets 106, 108 are connected to the shift reactor heavies outlet 102 and the separator lights outlet 122 as described above. In addition, a gas outlet 124 of the char gasifier 116 is connected to a gas inlet 126 of the shift reactor 54 and a gas inlet 128 and a char outlet 130 of the char gasifier 116 are connected to a gas outlet 132 and a char inlet 134 of the char combustor 118. The char combustor 118 also has a char outlet 136 connected to a char inlet 138 of the carbon burn-out cell 120, a gas inlet 139 connected to a gas outlet 141 of the carbon burn-out cell 120, and a $CaSO_4$ inlet 140 connected to an outlet of the oxidizer reactor 14. The carbon burn-out cell 120 also has a CaS/fuel outlet 142 connected to an inlet of the oxidizer reactor 14, preferably has a $CaSO_4$ inlet 144 connected to an outlet of the oxidizer reactor 14, and may have an air inlet 146.

As described above, the oxidizer reactor 14 produces $CaSO_4$ in an exothermic reaction. The heat produced in this reaction is absorbed by the $CaSO_4$ and is transported 28 with the $CaSO_4$ to the reducer reactor 16. A portion of the flow of hot $CaSO_4$ is preferably split into three streams, with a small portion of the hot $CaSO_4$ being fed along a path 148 to the carbon burn-out cell 120 and larger portions of the hot $CaSO_4$ being fed along paths 150, 153 to the char combustor 118 and, when necessary, to the char gasifier 116. The heat and oxygen content of the hot $CaSO_4$ decarbonizes the char received in the carbon burn-out cell 120, completing the decarbonization of the coal and producing a $CO_2$ rich gas which is discharged along a path 151 to the char combustor and cool CaS which is discharged along a path 152 to the oxidizer reactor 14. The heat and oxygen content of the hot $CaSO_4$ partially decarbonizes the char received in the char combustor 118, producing hot $CO_2$, CO and $H_2O$. The remaining char is discharged along a path 154 to the carbon burn-out cell 120 and the hot gases are discharged along a path 156 to the char gasifier 116. The heat and oxygen content of the hot gases (and $CaSO_4$ when fed along a path 153 to the char gasifier 116) partially decarbonizes the char received in the char gasifier 116, producing hot $H_2$ and hot CO rich syngas. The remaining char is discharged along a path 158 to the char combustor 118 and the hot gases (including any remaining hot $CO_2$ and hot $H_2O$) are discharged along a path 160 to the shift reactor 54.

It should be appreciated that staged gasification of the coal with the coal solids and coal gases moving in counterflow provides an efficient means to maximize carbon conversion/minimize unburned carbon and maximize the production of $H_2$ and CO gas while also providing an efficient means for transferring the heat energy produced by the oxidizer reactor to both the reducer reactor 16 and the shift reactor 54. It should be further appreciated that the hot gases fed along a path 160 from the char gasifier 116 to the shift reactor 54 will further heat the $CaCO_3$ which is fed along a path 70 from the shift reactor 54 to the calciner 42, thereby reducing the heat energy required to perform the calcination process. If additional heat input is required for the calciner 42, hot $CaSO_4$ may be fed along a path 162 from the oxidizer reactor 14 to the shift reactor 54. Alternatively, bauxite or other inert particles may be circulated between the oxidizer reactor 14 and the calciner 42 via the shift reactor 54.

Figure 2:
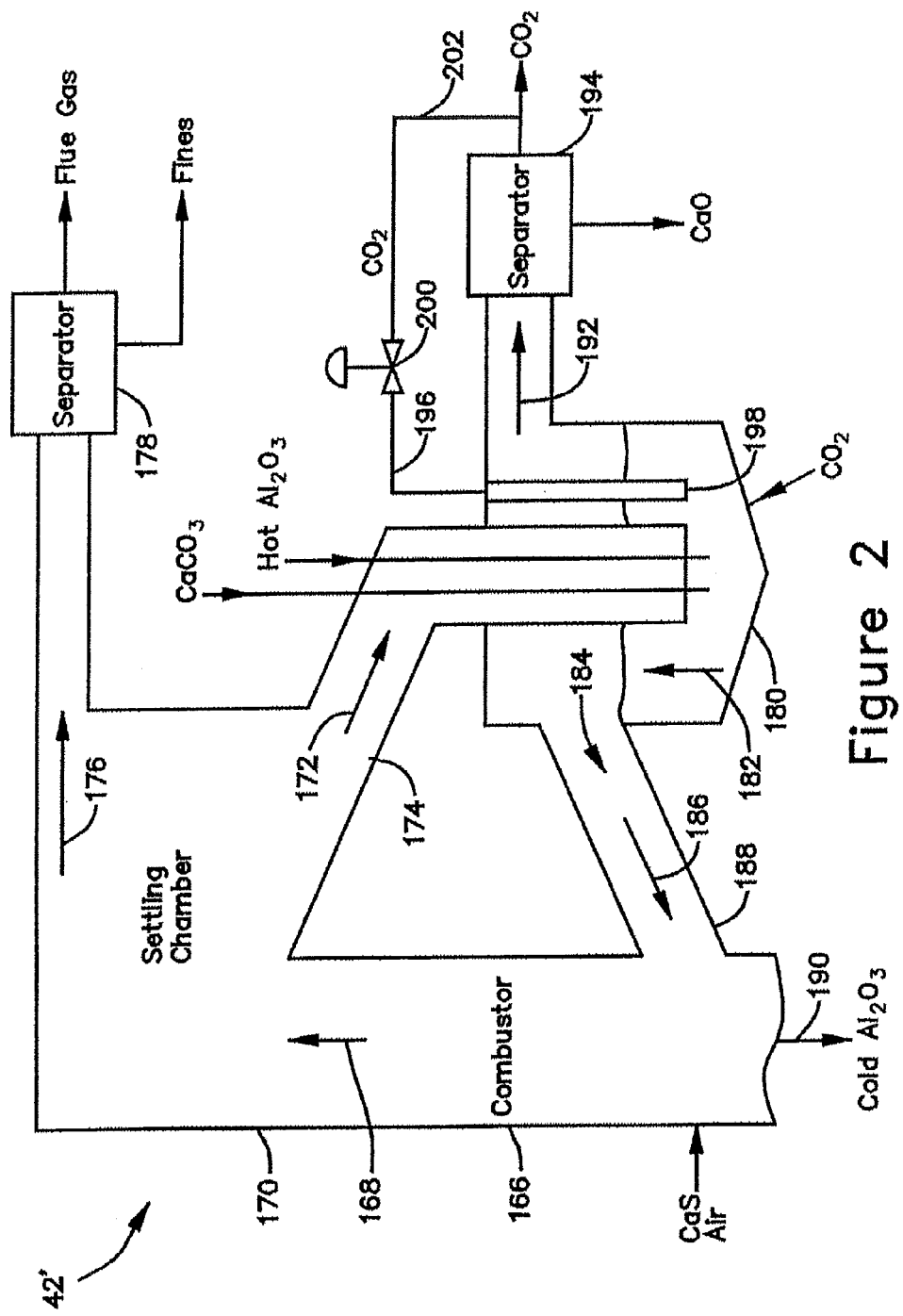
FIG. 2 is a simplified schematic diagram of the calciner of FIG. 1.

In an alternative embodiment, the calciner 42' may include a combustor 166 in which air and CaS are combusted to produce additional heat for the calciner 42' (FIG. 2). Particles of hot sorbent entrained in the flue gas are discharged along a path 168 from the combustor 166 and enter a settling chamber 170, where the heavy hot solids fall out along a path 172 of the flue gas and exit the settling chamber via a sloped duct 174. The flue gas and entrained lights are discharged along a path 176 to a separator 178, where the fines are separated from the flue gas. The hot heavy solids are fed by the duct 174 into the calciner vessel 180, along with the cool $CaCO_3$ and hot bauxite particles (if being used). The heat from the heavy solids and bauxite particles calcines the $CaCO_3$, producing CaO and $CO_2$ (for subsequent use or sequestration).

The hot heavy solids, $CaCO_3$ and hot bauxite particles are introduced near the bottom of the calciner vessel 180, $CO_2$ is released thereby forcing the cooling heavy solids, cooling bauxite and the $CaCO_3$/CaO upwards along a path 182. The cold heavy solids and cold bauxite spill over a location 184 the side of the calciner vessel 180 and are fed along a path 186 to the combustor 166 by a spillway 188. The cold bauxite is returned along a path 190 to the oxidizer reactor 14 for heating and the heavy solids are further combusted in the combustor 166. The relatively light CaO is entrained in the $CO_2$, the combined CaO and $CO_2$ being discharged along a path 192 from the calciner vessel 180 to a separator 194 which removes the CaO from the $CO_2$. A portion of the $CO_2$ is removed along a path 196 from the calciner vessel 180 by a filter 198 which prevents the CaO entrained therein from also being removed. A valve 200 in the bypass line 202 controls the volumetric flow of $CO_2$ through the bypass line 202, thereby controlling the $CO_2$ flow distribution between the separator 194 and the bypass line 202 and controlling the exit velocity of the $CO_2$ to the separator 194 to prevent entrainment of heavy solids in the exiting $CO_2$.

To maintain the efficiency of the chemical process loops described above, it is important to maintain the sorbent activity of the chemicals utilized in the chemical process loops 12, 52. As discussed above, fuel bound sulfur is continuously captured in the CaS/$CaSO_4$ loop 12, requiring continuous removal at a location 46 of $CaSO_4$ and continuous addition at a location 40 of $CaCO_3$. The $CaCO_3$ is removed from the CaO/$CaCO_3$ loop 52, requiring the continuous addition at a location 94 of CaO. The continuous replenishment at the location 94 of CaO substantially regenerates the calcium compounds used in the gasifier 10, keeping the chemical reactivity high. In addition, the sorbent activity of the chemicals is enhanced by the reduction reactions and hydration reactions employed in the chemical process loops 12, 52, which weaken the $CaSO_4$ and $CaCO_3$ shells. The CaO produced by the calciner 42 passes through an activator 204 which mechanically breaks the particle, exposing additional surface. The activator 204 includes an eductor where a portion of the flow of CaO is entrained in a flow of gas and accelerated thereby. The entrained CaO is impacted against a surface of the activator 204, the impact mechanically fracturing the particles, assisted as necessary by steam or water hydration 206.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for producing a gas product from a carbonaceous fuel in a gasifier, the system comprising:
    an oxidizer reactor that oxidizes CaS in air therein to form hot $CaSO_4$;
    a reducer reactor that receives the hot $CaSO_4$ and a carbonaceous fuel wherein the hot $CaSO_4$ and the carbonaceous fuel undergo an endothermic reaction therein and utilizing heat content of the hot $CaSO_4$ to form CaS and a gas product;
    an inlet to supply oxygen to the reducer reactor in a sufficient amount for substantially complete combustion of the carbonaceous fuel such that the gas product is substantially all $CO_2$ and steam; and a first separator that receives a gas flow from the reducer reactor, wherein the gas flow includes the gas product and entrained CaS, and separates the gas product and entrained CaS of the gas flow, wherein the separated CaS is provided to the oxidizer reactor for use in the oxidizing.

2. The system of claim 1, wherein the reducer reactor receives a calcium oxide bearing compound.

3. The system of claim 2, wherein the calcium oxide bearing compound includes $CaCO_3$.

4. The system of claim 2, wherein the calcium oxide bearing compound includes CaO.

5. The system of claim 1, wherein the oxidizer reactor oxidizes CaS in air therein to further form a waste gas; and further comprising:
a second separator that separates the hot $CaSO_4$ and the waste gas, wherein the separated $CaSO_4$ is provided to the reducer reactor.

6. The system of claim 5, wherein the waste gas includes principally nitrogen.

7. The system of claim 5, further comprising:
a heat exchanger using heat content of the waste gas to heat the air provided to the oxidizer reactor.

8. The system of claim 5, wherein a portion of the hot $CaSO_4$ is discharged after separating the hot $CaSO_4$ and the waste gas.

9. The system of claim 1, further comprising a heat exchanger to use the heat content of a waste gas to heat the air.

10. The system of claim 1, wherein the reducer reactor includes an exit at an upper portion of the reducer reactor from which the gas flow exits to the first separator.

11. The system of claim 1, further comprising:
a heat exchanger that uses the heat content of the gas product to heat the air, wherein the heated air is provided to the oxidizer reactor.

12. The system of claim 1, further comprising a regenerative heat exchanger to heat the air from using the heat content of the gas product to produce heated air.

13. The system of claim 1, further comprising a heat exchange unit to heat the water using the heat content of the hot $CaSO_4$ to produce a flow of steam.

14. The system of claim 1, wherein the carbonaceous fuel includes sulfur.

15. The system of claim 1, wherein the oxidizer reactor includes CaO that captures sulfur to form $CaSO_4$.

16. The system of claim 1, wherein the reducer reactor is formed of a single chamber.

17. The system of claim 1, wherein the oxygen is provided by an air stream.

18. The system of claim 1, wherein the oxygen is provided by a calcium oxide bearing compound.

19. A system for producing a gas product from a carbonaceous fuel in a gasifier, the system comprising:
an oxidizer reactor oxidizing CaS in air therein to form hot $CaSO_4$;
a reducer reactor that receives the hot $CaSO_4$ and carbonaceous fuel wherein the hot $CaSO_4$ and the carbonaceous fuel undergo an endothermic reaction therein utilizing heat content of the hot $CaSO_4$ to form CaS and a gas product;
an inlet to supply oxygen to the reducer reactor in an amount of oxygen for partial oxidation of the carbonaceous fuel such that the gas product is syngas; and
a first separator that receives a gas flow from the reducer reactor, wherein the gas flow includes the gas product and entrained CaS, and separates the gas product and entrained CaS of the gas flow, wherein the separated CaS is provided to the oxidizer reactor for use in the oxidizing.

20. The system of claim 19, wherein the syngas is rich in carbon monoxide.

21. The system of claim 19, wherein the reducer reactor further receives a calcium oxide bearing compound.

22. The system of claim 19, wherein the oxidizer reactor oxidizes CaS in air therein to further form a waste gas; and further comprising:
a second separator that separates the hot $CaSO_4$ and the waste gas, wherein the separated $CaSO_4$ is provided to the reducer reactor.

23. The system of claim 19, wherein the reducer reactor includes an exit at an upper portion of the reducer reactor from which the gas flow exits to the first separator.

24. The system of claim 19, wherein the reducer reactor is formed of a single chamber.

25. The system of claim 19, wherein the oxygen is provided by an air stream.

26. The system of claim 19, wherein the oxygen is provided by a calcium oxide bearing compound.

27. A system for producing a gas product from a carbonaceous fuel in a gasifier, the system comprising:
an oxidizer reactor oxidizing CaS in air therein to form hot $CaSO_4$;
a reducer reactor that receives the hot $CaSO_4$ and a carbonaceous fuel wherein the hot $CaSO_4$ and the carbonaceous fuel undergo an endothermic reaction therein utilizing heat content of the hot $CaSO_4$ to form CaS and a gas product; and
a first separator that receives a gas flow from the reducer reactor, wherein the gas flow includes the gas product and entrained CaS, and separates the gas product and entrained CaS of the gas flow, wherein the separated CaS is provided to the oxidizer reactor for use in the oxidizing.

28. The system of claim 27, wherein the oxidizer reactor oxidizes CaS in air therein to further form a waste gas; and further comprising:
a second separator that separates the hot $CaSO_4$ and the waste gas, wherein the separated $CaSO_4$ is provided to the reducer reactor.

29. The system of claim 27, wherein the reducer reactor includes an exit at an upper portion of the reducer reactor from which the gas flow exits to the first separator.

* * * * *